C. McNELLIS.
COUPLING FOR THE INFLATING VALVES OF PNEUMATIC TIRES.
APPLICATION FILED OCT. 3, 1908.
935,048.
Patented Sept. 28, 1909.
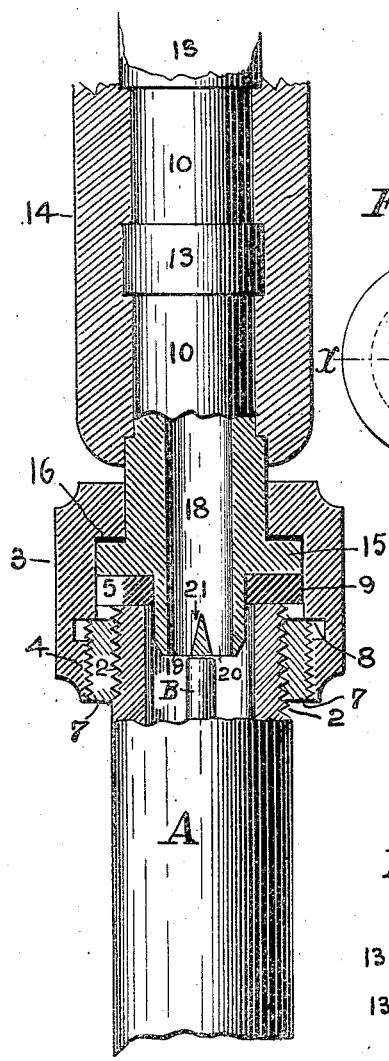
Witnesses:
E. Knudsen
A. S. Peterson
Inventor:
Charles McNellis,
By Michael J. Stark & Sons,
Attorneys.

UNITED STATES PATENT OFFICE.

CHARLES McNELLIS, OF CHICAGO, ILLINOIS.

COUPLING FOR THE INFLATING-VALVES OF PNEUMATIC TIRES.

935,048.

Specification of Letters Patent. Patented Sept. 28, 1909.

Application filed October 3, 1908. Serial No. 455,993.

*To all whom it may concern:*

Be it known that I, CHARLES MCNELLIS, a citizen of the United States, and resident of Chicago, in the county of Cook and State of Illinois, have invented certain new and useful Improvements in Couplings for the Inflating-Valves of Pneumatic Tires; and I do hereby declare that the following description of my said invention, taken in connection with the accompanying sheet of drawings, forms a full, clear, and exact specification, which will enable others skilled in the art to which it appertains to make and use the same.
This invention has general reference to improvements in hose-couplings for the inflating-valves of pneumatic tires, whereby the air-compressor or tire-pump is connected with said valve, and the latter opened by the act of attaching the coupling to said valve; and it consists, essentially, in the novel and peculiar combination of parts and details of construction as hereinafter first fully set forth and described and then pointed out in the claims.

In the drawings already referred to, and which serve to illustrate this invention more fully, Figure 1 is a longitudinal sectional elevation of this device taken in line $x$ $x$ of Fig. 3. Fig. 2 is an elevation, partly in section, of the tail-piece, showing a modification of my device. Fig. 3 is an inverted plan of said tail-piece, and Fig. 4 a perspective view of a portion of the same, all these figures being drawn on a very much enlarged scale. Fig. 5 is a perspective view of the coupling drawn to nearly full size.

Like parts are designated by corresponding symbols and characters of reference in all the figures.

The object of this invention is the production of a hose-coupling for connecting an air-compressor or air-pump with the inflating-valve of pneumatic tires, that shall be so arranged that when the coupling is applied to the inflating-valve, it will automatically open the valve for the admission of air and allow the same to close instantly when the hose-coupling is removed therefrom.

To accomplish the results described, and to produce a hose-coupling that shall be eminently effective, serviceable, and durable, I construct this hose-coupling substantially as follows:

The reference-letter A in the drawings designates a portion of an inflating-valve for pneumatic tires, which valve is always provided with a valve-spindle B, which, as usually constructed, has a valve-proper, not shown, acted upon by a spiral spring to normally close the inflating-valve, and which valve is opened by depressing said valve-spindle. The outer, upper, end of this valve is externally screw-threaded at 2, to permit connection being made with the valve A to inflate a tire.

3 represents the coupling-nut. It is, preferably, a hexagonal body having an interior screw-thread 4, and a reduced bore or chamber 5, to receive a tail-piece 6, to be hereinafter described. In this nut there is permanently located a sleeve 7, which is externally screw-threaded to engage with the internal screw-thread of the nut 3, and internally screw-threaded for attachment to the inflating-valve A, as clearly illustrated in Fig. 1, said sleeve 7 being screwed in, and forced against, a seat 8, in said nut after the tail-piece 6 with its packing-disk 9 is placed in the nut 3, and it is then soldered to the nut to prevent its unscrewing and the withdrawal of said tail-piece 6, so as to permanently but revolubly connect the parts.

The tail-piece 6 consists of a tube having the usual corrugations 10, to form retaining-collars 13, whereby the rubber hose 14 is securely held to the tail-piece. This tube has a collar or flange 15, which engages the shoulder 16 in the coupling-nut 3, and projecting centrally from said collar 15 and in axial line with said tube there is a nipple 17, of such a length that when the coupling is in normal position upon the inflating-valve A, said nipple will force the valve-rod B downwardly, sufficiently to fully open the inflating-valve proper. In order to accomplish this result without reducing the passage 18, in said tail-piece, this nipple 17, which when first produced is cylindrical in contour, is flattened at its lower end and then at diametrically opposite sides forced inwardly, as shown in Fig. 4, thereby producing, as it were, two passages 19, 20, by forming a bridge 21 which bridge bears upon the upper end of the valve-rod B, as clearly illustrated in Fig. 1. As a modification of this construction I may drill separate passages 19 20, into the nipple 17, as shown in Fig. 2, such modification being clearly within the scope of my present invention.

The packing-disk 9 already mentioned is preferably made from fiber or similar hard, yet to a certain extent elastic, material, and it is held within the coupling-nut 3 by the sleeve 7.

In order to assemble the parts of which this coupling is composed, the packing-disk 9 is first placed upon the nipple 17 and then the tail-piece passed into the nut, after which the sleeve 7 is screwed into the nut and then soldered therein, as already mentioned.

When placed upon the inflating-valve A, the packing-disk 9 bears upon the upper edge of the inflating-valve A and thereby tightly connects the coupling with the same, the nipple 17 having opened the inflating-valve proper, as described. When the coupling is being removed from the inflating-valve A, the valve-rod B will move with the tail-piece so that when the hose-coupling has been disconnected from the inflating-valve A, its valve proper has again reached its normal, closed position.

It will now be observed that this hose-coupling is self-contained, that is to say; there are no loose parts that are liable to be lost for the reason that the sleeve 7 prevents the packing-disk as well as the tail-piece from being withdrawn from the nut. The parts are all readily and cheaply produced by suitable machinery so that this hose-coupling can be manufactured and sold at a very reasonable price. It is practically indestructible and being of standard size, will fit all standard tire-inflating valves now in the market.

Having thus fully described this invention, I claim as new and desire to secure to me by Letters Patent of the United States—

1. A hose-coupling adapted to open a tire-inflating valve when attached to said valve, comprising an internally screw-threaded coupling-nut, there being in said nut a reduced chamber and a still further reduced passage for the tail-piece; a tail-piece, there being an integral flange on said tail-piece and a nipple smaller than the tubular body of said tail-piece; an internally and externally screw-threaded sleeve in said nut, and a packing disk upon said nipple and bearing against the flange of the tail-piece and the inner surface of said sleeve; said sleeve being permanently secured in said nut, and the packing-disk and the tail-piece permanently retained in said nut, there being a central passage through the tail-piece the lower exit opening being contracted to engage the stem of an inflating-valve as and for the object stated.

2. In a tire-inflating valve adapted to be opened by the application of a hose-coupling having a member adapted to act upon the valve-stem of said inflating-valve, a hose-coupling comprising an internally screw threaded coupling-nut, there being a reduced chamber and a still smaller passage in said nut; a tail-piece, being a tube having a bore throughout its entire length; a flange on said tube engaging the reduced chamber, and a nipple at the end of said tube; a packing-disk upon said nipple, and a sleeve in said nut and permanently secured therein, said packing disk being interposed between the lower surface of said flange and the upper surface of said sleeve to irremovably secure the packing and the tail-piece to said coupling-nut, the exit-end of the central passage in said tail-piece being contracted to afford a bridge across said exit-opening to engage the stem of the inflating-valve when the coupling-nut is applied to said valve, as specified.

3. In a hose-coupling for pneumatic tire-valves, a coupling-nut; a tail-piece, there being a flange and a nipple on said tail-piece; a packing disk upon said tail-piece, and a sleeve in said nut and permanently secured therein after the packing-disk and the tail-piece have been placed in said nut, said packing-disk being interposed between the lower surface of said flange and the upper surface of said sleeve.

4. A hose-coupling including a tail-piece and a coupling-nut, said tail-piece being a tubular body, there being a series of retaining collars and a larger collar on said tubular body and a nipple below said larger collar, the whole being an integral body, said nipple being cylindrical at its junction with said collar and oblong at its end, there being diametrically opposite contractions at the lower end of said nipple affording a bridge in the passage through said body and dividing the said passage at its end into two branches, as specified.

In testimony that I claim the foregoing as my invention—I have hereunto set my hand in the presence of two subscribing witnesses.

CHARLES McNELLIS.

Attest:
MICHAEL J. STARK,
A. G. PETERSON.